United States Patent Office 3,040,007
Patented June 19, 1962

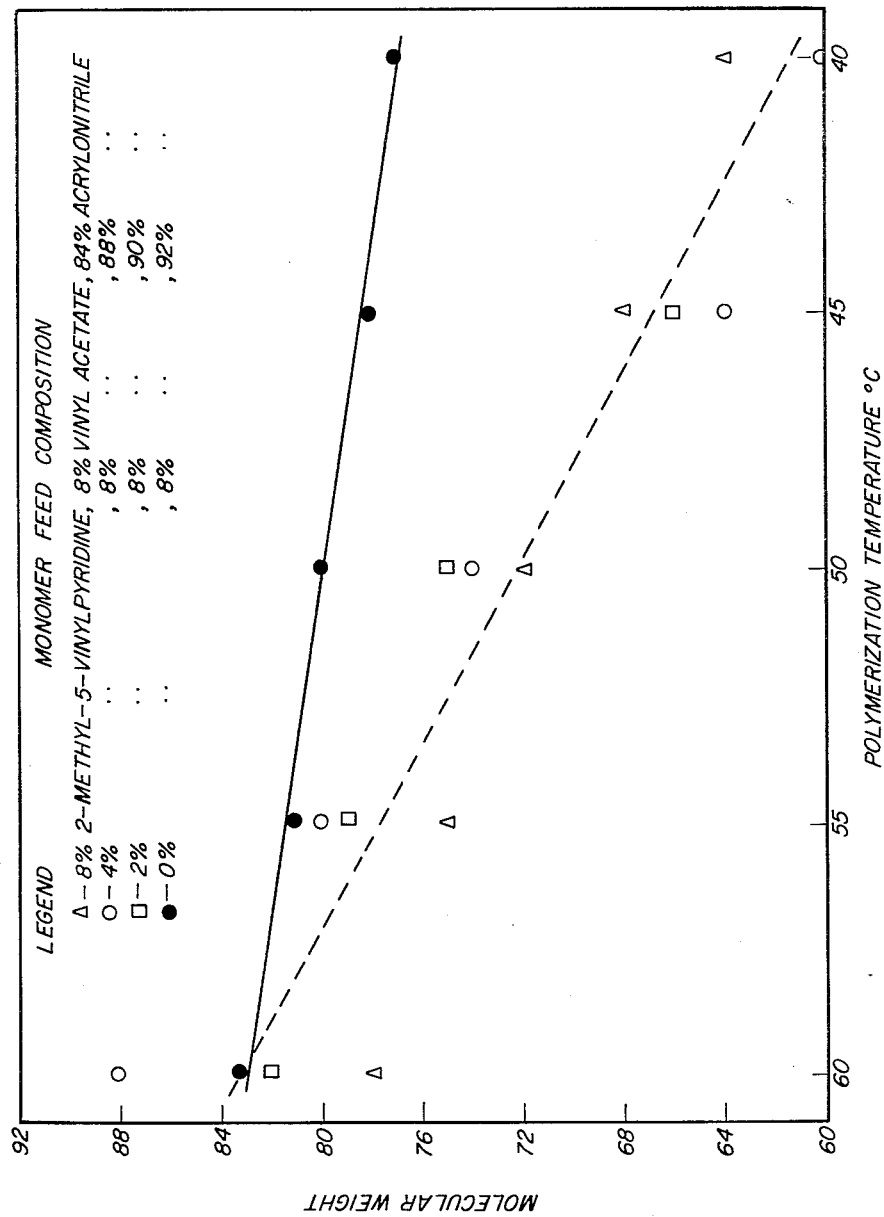

3,040,007
MOLECULAR WEIGHT CONTROL IN ACRYLONITRILE POLYMERIZATION USING CHLORATE-SULFITE CATALYSTS BY TEMPERATURE DECREASE
Witold R. Kocay, Stamford, Conn., and Marvin Wishman, White Plains, N.Y., assignors to American Cyanamid Company, New York, N.Y., a corporation of Maine
Filed Aug. 25, 1960, Ser. No. 51,922
6 Claims. (Cl. 260—80.5)

This invention relates to the preparation of polymers. More particularly, the invention is concerned with certain new and useful improvements in a method of preparing a polymer of polymerizable material comprising acrylonitrile alone or with a minor proportion (i.e., less than 50%) by weight of at least one compound containing a $CH_2=C<$ grouping by polymerizing said polymerizable material in an aqueous medium at a pH not higher than about 4.0, using a particular polymerization catalyst system, namely, a redox-catalyst system comprising chlorate ions and sulfite ions. Thus it will be seen that the present invention involves the preparation of polymers by polymerizing polymerizable material comprising essentially a major or preponderant proportion (more than 50%) by weight of acrylonitrile.

Polymers of acrylonitrile and of other polymerizable organic compounds containing at least one ethylenic bond are, of course, known. These polymers have achieved wide use in the production of many valuable commercial products, e.g., plastic and coating compositions, synthetic rubber, and, more recently, synthetic fibers.

Difficulties have been encountered in polymerizing certain of the aforementioned polymerizable organic compounds, e.g., acrylonitrile alone and with other monomers, and especially in controlling the average molecular weight and molecular-weight distribution of the polymer; and considerable effort has been spent in developing practical processes for preparing these extremely useful homopolymers and copolymers that would overcome these difficulties. Thus, recent developments in the polymerization of acrylonitrile have been concerned largely with polymerization in aqueous media, for instance as described in Jacobson United States Patent No. 2,436,926, March 2, 1948, Brubaker and Jacobson United States Patent No. 2,462,354, February 22, 1949, Richards United States Patent No. 2,628,223, February 10, 1953, Rothrock United States Patent No. 2,640,049, May 26, 1953, and Scheiderbauer et al. United States Patent No. 2,748,106, May 29, 1956; and with the use of redox-catalyst systems that aim to give a high yield of polymer in a short time at a moderate temperature. Redox-catalyst systems comprising a peroxy compound and a sulfoxy compound, such as, for example, ammonium persulfate and sodium bisulfite, have been used for the homopolymerization and copolymerization of acrylonitrile and other vinyl compounds (see, for example, the aforementioned United States patents); and, also redox systems comprising a water-soluble chlorate, e.g., sodium or potassium chlorate, and a water-soluble sulfite or bisulfite, e.g., sodium sulfite or bisulfite (see, for instance, Hill United States Patent No. 2,673,192, March 23, 1954, Cresswell United States Patent No. 2,751,374, June 19, 1956, and Mallison United States Patent No. 2,777,832, January 15, 1957).

The problems encountered in forming spinnable or fiber-forming polymers, more particularly copolymers of acrylonitrile and a vinylpyridine, that are uniform from the standpoint of molecular-weight distribution and structure, and in other characteristics, are pointed out in the above-named Rothrock Patent No. 2,640,049.

The present invention is based on our discovery that, in a polymerization method of the kind broadly described in the first paragraph of this specification, the average molecular weight of the polymer which forms can be decreased by decreasing the temperature (more particularly within the range of from 20° C. to 70° C., advantageously from about 35° C. to about 65° C.) at which the polymerization is effected while maintaining substantially constant all other conditions that influence the polymerization reaction. Such influencing conditions include, but are not limited to, the pH of the reaction medium, the ratio of chlorate ions plus sulfite ions to the polymerizable material, the ratio of water to polymerizable material, the ratio of chlorate ions to sulfite ions, the average residence time of the monomer in the reactor (as in a continuous process, for example) and the average percentage of polymer solids in the reactor (also as in a continuous process, for instance).

More particularly, we have found that, by employing the above technique, we can produce polymers of controlled average weight in a simple and easily regulated manner. Thus, in a continuous polymerization process the several feeds of ingredients to the reactor can be maintained constant (substantially constant) and only the temperature of the reaction mass used to correct the average molecular weight of the polymer when it appreciably varies from the value desired to be maintained. Specifically, when the average molecular weight of the polymer rises above a prescribed standard, the temperature of the reaction mass is decreased (while maintaining all other influencing factors substantially constant) sufficiently to bring the average molecular weight of the polymer to the value sought to be maintained.

It was quite surprising and unexpected that temperature alone could be used in the manner described above to control the average molecular weight of a polymer of the kind and in a process such as is involved in this invention. This is because the prior art teachings are that the average molecular weight of the polymer obtained increases as the temperature of polymerization is decreased. In other words, the prior-art teachings are directly contrary to the results obtained by following the teachings of this invention. See, for example, the following United States patents where these teachings are to be found: 2,436,926, Jacobson, col 7, lines 4–11; 2,628,223, Richards, col. 3, line 74, to col. 4, line 7; 2,654,731, Patterson, col. 3, lines 47–51; and the figure of the drawing of 2,911,397, Janssen et al. See, also, Hill United States 2,673,192 (paragraph beginning in line 60 of col. 5 and ending in line 12 of col. 6), wherein the patentee, who was concerned primarily with the polymerization of vinyl chloride, specifically states that "temperatures substantially above this latter range [35°–45° C.] increase the rate at which the vinyl chloride is polymerized but decrease the average molecular weight of the polymer produced, and that temperatures substantially below 25° C. increase the average molecular weight of the polymer molecule beyond the technically useful range for milling and extruding purposes . . . ."

With respect to other prior art, it may here be noted that Cresswell in his U.S. Patent 2,751,374 discloses the polymerization, at temperatures ranging from about 20° C. to about 70° C., of polymerizable matter containing a major proportion of acrylonitrile in the presence of an oxidation-reduction catalyst system comprising chloric acid and sulfurous or hydrosulfurous acid. However, there is nowhere any teaching or the faintest suggestion in this Cresswell patent of the effect of the temperature of the polymerization reaction on the molecular weight of the polymer; or specifically, as the applicants have found, that the average molecular weight of the polymer which forms can be decreased by decreasing the temperature, within the range of from 20° C. to 70° C., at which the polymerization is effected while maintaining substantially constant all other conditions that influence the polymerization reaction.

As shown by the aforementioned Hill, Cresswell, and Mallison patents, acidic aqueous catalyst systems containing reducible chlorate ions and oxidizable sulfoxy ions have been suggested for use in the polymerization of various vinyl compounds, including vinyl chloride, acrylonitrile, vinyl acetate, and others. The oxidizable sulfoxy ions used in such systems have generally been of the group consisting of sulfite, bisulfite, and hydrosulfite ions, and these same sulfoxy ions comprise a preferred group employed in practicing the present invention, but it is not intended that the invention shall be limited to the use of only this group. While the components of an oxidation-reduction or redox-catalyst system of this nature may be introduced as chloric and sulfurous acids, these acids are relatively unstable; therefore, it is usually more convenient to add the desired ions to the polymerization system in the form of a water-soluble chlorate and a water-soluble salt containing the oxidizable sulfoxy ion, e.g., a water-soluble sulfite, together with a suitable acid such, for instance, as sulfuric acid, phosphoric acid, hydrochloric acid, etc. During polymerization in an aqueous system containing a chlorate-sulfoxy catalyst combination, the chlorine is reduced and the sulfur simultaneously oxidized.

The improvement of the present invention is applicable in a polymerization method of the kind broadly described in the first paragraph of this specification, and where acrylonitrile constitutes the major proportion (i.e., more than 50%) by weight of the nonomeric substance. The polymerization can be carried out batchwise, semicontinuously or continuously. A continuous method is preferred. Polymerization can be effected while the polymerizable material comprising acrylonitrile is dissolved or dispersed (as by emulsification, for example) in an aqueous medium having a pH of 4.0 or less, advantageously from about 2.0 to about 3.6. The reaction mass comprises the aforesaid polymerizable material, the aforesaid aqueous medium and a redox-polymerization-catalyst system that includes, as essential components, (a) a water-soluble chlorine compound that yields chlorate ions in an aqueous acidic medium and (b) a water-soluble sulfoxy compound that yields oxidizable sulfoxy ions in an aqueous acidic medium. This aqueous acidic medium advantageously comprises an aqueous solution of a non-oxidizable acid having a dissociation constant greater than $10^{-3}$, e.g., sulfuric, nitric, phosphoric, hydrochloric, or other strong acid.

When the polymerization reaction is carried out continuously, one can, if desired or required, charge additional water to the reactor, separately or with one or another of the various feeds of the aforementioned ingredients, so that a desired concentration of materials in the aqueous medium is maintained in the reactor. It is usually preferable to limit the amount of water so that the total weight of polymerizable monomers is between about 15% and 50% of the total material charged during the polymerization reaction. This is especially true when the polymerizable material comprises a substantial amount by weight of acrylonitrile, e.g., from 65 to 85% or more, since the resulting suspension of polymer then has excellent pumping characteristics, as well as outstanding drainage or filtering qualities. Additional economies are, of course, realized in that a small volume of the reaction mass is processed and handled. No difficulties are encountered with respect to separation of polymerizable material, since the acrylonitrile or polymerizable ingredients including acrylonitrile are charged at a rate which is correlated with the rate of polymerization in such a manner that separation of polymerizable material, specifically monomeric material, does not occur.

In the redox-polymerization-catalyst system employed, the amount of chlorate ions introduced to the reaction mass (reactor) generally will be between about 0.1% and about 2.0% of the weight of the polymerizable monomeric material including acrylonitrile, and the oxidizable ions, specifically sulfoxy ions, will be present in a quantity ranging between about 0.1% and about 6% by weight on the same basis. Larger amounts of the catalyst components, e.g., 3 or more percent of chlorate ions and 9 or more percent of sulfoxy ions, are operative, but appear to provide no additional benefits. When the oxidizing and reducing components are present in oxidation and reduction equivalents, then in the case of the preferred oxidizable component, 3 moles of the sulfurous acid or a sulfite react per mole of chloric acid or a chlorate. The ratio is the same for bisulfites, but only 1.5 moles of a meta-bisulfite are required, since such salts ionize to form $HSO_3-$ ions.

In the redox-polymerization-catalyst system used in practicing the present invention, any water-soluble chlorine compound that yields chlorate ions in an aqueous acidic medium can be used, for instance: chloric acid, ammonium, and the various alkali-metal (sodium, potassium, lithium, etc.) chlorates; and the various water-soluble, alkaline-earth metal and heavy metal chlorates. Illustrative examples of reducing agents that can be employed are sulfites, bisulfites, and metabisulfites corresponding to the chlorates named in the proceding paragraph, sulfur dioxide, and diethyl and other water-soluble dialkyl sulfites.

By the term "sulfite ions" as used herein and in the appended claims is intended to be included the various sulfoxy species, more particularly $H_2SO_3$ and/or $HSO_3^-$ and $SO_3^=$, the proportionate amounts of these species being a function of pH. We believe that the active component is probably the $H_2SO_3$ molecule.

The polymerization temperature employed ranges from 20° C. to 70° C. Particularly good results are obtained when the temperature of polymerization is maintained within the range of from about 35° C. to about 65° C.

It is desirable to conduct the process of the present invention in the absence of oxygen, which has a definite inhibiting effect on the polymerization reaction. Suitable inert gases, such as nitrogen and carbon dioxide, may be used to displace air in the reaction zone.

Polymerizable materials that can be polymerized include acrylonitrile alone and mixtures thereof with monoethylenically unsaturated compounds such as those mentioned in the aforesaid Cresswell and Mallison patents. Other examples (some of which are named in the prior-art patents acknowledged hereinbefore) are the vinyl aromatic and isopropenyl aromatic compounds, more particularly the different vinyl aromatic and isopropenyl aromatic hydrocarbons (e.g., the various dialkyl styrenes, isopropenyl toluene, etc.), other aliphatic compounds containing a $CH_2=C<$ grouping, e.g., the various substituted acrylonitriles (e.g., methacrylonitrile, ethacrylonitrile, phenylacrylonitrile, etc.), the various substituted acrylamides (e.g., methacrylamide, ethacrylamide, the various N-substituted acrylamides and N-substituted alkacrylamides, for instance, N-methylol acrylamide, N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monaryl and -diaryl acrylamides and alkacrylamides, e.g., N-monophenyl and -diphenyl acrylamides and methacrylamides, etc.), vinyl esters, e.g., vinyl acetate, vinyl chloroacetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, diallyl amine, dimethallyl amine, vinyl ethyl ether, diallyl benzene, as well as other vinyl aromatic and vinyl aliphatic compounds, and other compounds containing a $CH_2=C<$ grouping, more particularly a single $CH_2=C<$ grouping. Two, three, four, five, or any desired higher number of monomers can be admixed and copolymerized in accordance with the present invention. In producing fiber-forming copolymers, and which preferably have an average molecular weight within the range of from about 60,000 to about 90,000, we prefer that the modifying comonomer employed be one that contains a single $CH_2=C<$ grouping. The average "molecular weight," as defined herein, is determined from an absolute viscosity value of a 1% solution of the polymer in 50% aqueous sodium thiocyanate.

In practicing the present invention to produce fiber-forming (fiber-formable) acrylonitrile copolymers, the monomeric material comprises more than 50%, more particularly at least 70%, by weight of acrylonitrile, e.g., 100% acrylonitrile; or, if the monomeric material is a monomeric mixture, it comprises more than 50% by weight of acrylonitrile while the remainder is constituted of at least one other different compound which is copolymerizable with acrylonitrile and which contains a $CH_2=C<$ grouping. Thus, in addition to acrylonitrile, the polymerizable material may include a plurality of different compounds which are copolymerizable with acrylonitrile and each one of which contains a $CH_2=CH-$ grouping, at least one of said compounds being a vinylpyridine. The present invention provides good results in preparing a copolymer of monomeric material comprising at least 80% by weight of acrylonitrile, from 2 to 15% by weight of a vinylpyridine, and from 2 to 15% by weight of vinyl acetate, methyl acrylate, acrylamide, methacrylamide, acrylic acid, methacrylic acid, methacrylonitrile, or the like.

Illustrative examples of vinylpyridines that can be copolymerized with acrylonitrile, alone or with one or more other copolymerizable monomers, by the method of the present invention, include vinylpyridines represented by the formula (I)

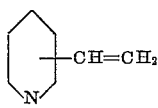

and which includes 2-vinylpyridine, 3-vinylpyridine, and 4-vinylpyridine; methyl vinylpyridines represented by the formula (II)

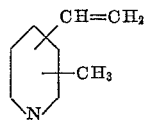

and which include 2-methyl-3-vinylpyridine, 2-methyl-5-vinylpyridine, 3-vinyl-4-methylpyridine, 3-vinyl-5-methylpyridine, 2-vinyl-3-methylpyridine, 2-vinyl-4-methylpyridine, 2-vinyl-5-methylpyridine, 2-vinyl-6-methylpyridine, 2-methyl-4-vinylpyridine, and 3-methyl-4-vinylpyridine. The vinylpyridines embraced by Formula II are a preferred sub-group within a broader class of vinylpyridines that are advantageously employed in continuously making dyeable, fiber-forming binary and ternary polymers in accordance with the instant invention and which may be represented by the formula (III)

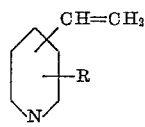

wherein, R represents a lower alkyl radical, more particularly a methyl, ethyl, propyl (including n-propyl and isopropyl) or butyl (including n-butyl, isobutyl, sec.-butyl and tert.-butyl) radical. Other examples include the 2- and 4-vinylquinolines, the various vinyl isoquinolines, 2-vinyl-4,6-dimethylpyridine, 2-vinyl-4,6-diethylpyridine, and others embraced by the formula (IV)

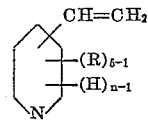

where R represents a lower alkyl radical, examples of which have been given hereinbefore, and $n$ represents an integer from 1 to 5, inclusive.

In order that those skilled in the art may better understand how the present invention can be carried into effect, the following examples are given by way of illustration and not by way of limitation. All parts and percentages are by weight unless otherwise stated.

EXAMPLE 1

(A) One hundred and fifty-two (152) parts of acrylonitrile, 8 parts of methyl acrylate, 3.41 parts of hydrogen chloride, and 1439 parts of deionized water are charged into a round-bottomed flask. The flask is placed in a constant-temperature bath, and a condenser, thermometer, stirrer, nitrogen-inlet tube, and dropping funnel are attached. The monomer mixture is heated at 50° C. under nitrogen for one hour. The catalyst, 0.852 part of sodium chlorate and 5.04 parts of sodium sulfite, is dissolved in 150 cc. of water into the dropping funnel. Forty (40) percent of the catalyst, 60 cc. of solution, is rapidly added to the reaction vessel. After 25 minutes, an additional 22.5 cc. of catalyst solution is added. The remaining catalyst solution is added at 25-minute intervals in volumes of 22.5, 15, 15, 7.5, and 7.5 cc. Catalyst addition is complete in 2.5 hours. The mixture is agitated 1.5 hours longer, and the polymer is collected by filtration. The pH of the effluent mother liquor is 2.8. Conversion of monomer to polymer is 87 percent of theory. The polymer has an average molecular weight of 88,000.

(B) The above example is repeated, except that the temperature of the reaction is maintained at 40° C. Conversion of monomer to polymer is 86 percent of theory. The polymer has an average molecular weight of 80,500.

(C) The (A) portion of this example is repeated, except that the temperature of the reaction is maintained at 30° C. Conversion of monomer to polymer is 78 percent of theory. The polymer has an average molecular weight of 75,000.

EXAMPLE 2

(A) One hundred and thirty-six (136) parts of acrylonitrile, 12 parts of vinyl acetate, 12 parts of 2-methyl-5-vinylpyridine, 4.02 parts of hydrogen chloride, and 980 parts of deionized water are charged into a round-bottomed flask. The apparatus is assembled as in Example 1. The catalyst, 0.85 part of sodium chlorate and 3.02 parts of sodium sulfite, is dissolved in 150 cc. of water into a dropping funnel. Polymerization is conducted as in Example 1, except that the temperature is maintained at 50° C. The pH of the effluent mother liquor is 2.0. Conversion of monomer to polymer is 65 percent of theory. The polymer has an average molecular weight of 77,000.

(B) The above example is repeated, except that the temperature is maintained at 45° C. Conversion of monomer to polymer is 64 percent of theory. The polymer has an average molecular weight of 61,000.

(C) The (A) portion of this example is again repeated, except that the temperature is maintained at 35° C. Conversion of monomer to polymer is 62 percent of theory. The polymer has an average molecular weight of 54,000.

EXAMPLE 3

(A) One hundred and sixty (160) parts of acrylonitrile, 1.2 parts of hydrogen chloride, and 1439 parts of deionized water are charged into a round-bottomed flask. The apparatus is assembled as in Example 1. The catalyst, 1.02 parts of sodium chlorate and 6.05 parts of sodium sulfite, is dissolved in 150 cc. of water into a dropping funnel. Polymerization is conducted as in Example 1, maintaining the temperature at 55° C. The pH of the effluent mother liquor is 2.9. Conversion of monomer to polymer is 85 percent of theory. The polymer has an average molecular weight of 87,000.

(B) The above example is repeated, except that the temperature during polymerization is maintained at 40° C. Conversion of monomer to polymer is 84 percent of theory. The polymer has an average molecular weight of 79,000.

EXAMPLE 4

(A) A water-jacketed reactor having a volume of 6.4 liters is supplied with a propeller-type stirrer, driven by a motor rotating at approximately 900 r.p.m. The reactor is equipped with a delivery-feed system; and, at its top, with an overflow tube. Polymer is collected by continuous filtration of the slurry overflow.

Six thousand four hundred (6,400) grams of water slurry containing 20% polymer prepared in a previous similar reaction ("seed" polymer) is charged to the reactor, adjusted to a pH of about 2 with nitric acid, and its temperature is brought to 60° C. A stream of monomers is introduced to the reactor through one of three delivery tubes. A second stream consists of an aqueous solution of weighed amounts of sodium chlorate and sodium sulfite. The third stream consists of an aqueous solution of nitric acid of known concentration.

Polymer produced during the first four hours of reaction is discarded. Under the conditions of reaction, it has been found that more than 92 percent of the seed polymer has been purged and that a steady state or equilibrium is set up before any polymer product is collected. The temperature of the reaction is maintained at 60° C. Monomer concentration and residence time are controlled by the feed rates at 28 percent monomer concentration and 1.5 hour residence time in the reactor. The pH is maintained at 2.0.

The compositions of the feeds are as follows:

Feed I—Monomers (85.0% acrylonitrile, 8.4% vinyl acetate, and 6.6% 4-vinylpyridine)
Feed II—Catalyst (102.5 grams of NaClO$_3$ and 363.0 grams of Na$_2$SO$_3$ in solution in 16 liters of water)
Feed III—Acid (512.5 grams of HNO$_3$ in solution in 16 liters of water)

Monomers (feed I) are fed at 1410 cc./hr., 1155 grams/hr. Catalyst (feed II) is fed at 1430 cc./hr. Therefore, the rate of NaClO$_3$/hr. is 9.15 grams/hr. and the rate of Na$_2$SO$_3$/hr. is 32.4 grams/hr. Acid (feed III) is fed at 1430 cc./hr. At equilibrium, the conversion of monomer to polymer is 78 percent. The polymer has an average molecular weight of 84,000.

(B) The above example is repeated in every detail, except that the temperature is maintained at 45° C. The conversion of monomer to polymer is 76 percent of theory. The polymer has an average molecular weight of 68,000.

EXAMPLE 5

(A) The procedure of Example 4 is followed, except for feed composition. The temperature is maintained at 35° C.

Feed I—Monomers (90% acrylonitrile, 5.0% vinyl acetate, 5.0% 2-methyl-5-vinylpyridine)
Feed II—Catalyst (85.8 grams of NaClO$_3$ and 253.0 grams of Na$_2$SO$_3$ in 16 liters of water)
Feed III—Acid (299 grams of HNO$_3$ in solution in 16 liters of water)

The rate of NaClO$_3$/hr. is 7.66 grams/hr. The rate of Na$_2$SO$_3$/hr. is 22.6 grams/hr. The pH is maintained at 3.3. At equilibrium, the conversion of monomer to polymer is 72 percent of theory. The polymer has an average molecular weight of 57,000.

(B) The above example is repeated in every detail, except that the temperature is maintained at 50° C. The conversion of monomer to polymer is 81%. The polymer has an average molecular weight of 72,000.

EXAMPLE 6

The procedure of Example 4 is followed except for feed compositions and the rate at which they are fed. The compositions of the feeds are as follows:

Feed I—Monomers (93.0% acrylonitrile and 7.0% methyl methacrylate)
Feed II—Catalyst (47.2 grams of NaClO$_3$ and 278.0 grams of Na$_2$SO$_3$ in solution in 16 liters of water)
Feed III—Acid (109.5 grams of HNO$_3$ in solution in 16 liters of water)

In order to maintain the monomer feed rate at 24 percent of the total feed and to maintain a residence time of 1.2 hours, the feeds are introduced into the reactor at the following rates: Monomers (feed I) are fed at 1500 cc./hr., 1230 grams/hr. Catalyst (feed II) is fed at 1500 cc./hr. Acid (feed III) is fed at 2340 cc./hr. The reaction temperature is maintained at 60° C. At equilibrium, the conversion of monomer to polymer is 78 percent. The polymer has an average molecular weight of 70,000.

When polymerization is conducted using conditions identical with those described above, except that the reaction temperature is 50° C., the polymer has an average molecular weight of 65,000.

EXAMPLE 7

A study of Examples 1–6 reveals that when the chlorate-sulfite catalyst system is used to polymerize acrylonitrile or acrylonitrile and one or more other vinyl monomers, the molecular weight of the polymer which is produced unexpectedly decreases when the polymerization temperature is decreased. While the molecular weight decrease is a function of temperature decrease, it is also a function of the exact monomer feed composition used. This relationship may be readily determined as in the following example:

(A) A series of polymerizations is conducted using the procedure of Example 6 except for feed composition:

Feed I—Monomers (84% acrylonitrile, 8.0% vinyl acetate, 8.0% 2-methyl-5-vinylpyridine)
Feed II—Catalyst (51.7 grams of NaClO$_3$ and 183.5 grams of Na$_2$SO$_3$ in solution in 16 liters of water)
Feed III—Acid (294 grams of HNO$_3$ in solution in 16 liters of water)

The temperature of polymerization is varied from 60° C. to 40° C. The conversion of monomer to polymer is determined by dividing the percent polymer in the slurry exiting from the reactor by 0.24. In order to ensure equilibrium, the polymer is collected for molecular weight determination only after the reaction has continued for at least four hours at the desired temperature. The data are in Table I.

Table I

| | Polymerization Temp., ° C. | Polymerization, pH | Conversion | Molecular Weight |
|---|---|---|---|---|
| 1-A | 60 | 3.5 | 70 | 78,000 |
| 1-B | 55 | 3.6 | 71 | 75,000 |
| 1-C | 50 | 3.5 | 70 | 72,000 |
| 1-D | 45 | 3.5 | 69 | 68,000 |
| 1-E | 40 | 3.5 | 71 | 64,000 |

(B) The (A) portion of this example is repeated, except that the monomer (feed I) contains 4.0 percent 2-methyl-5-vinylpyridine, 8.0% vinyl acetate and 88 percent acrylonitrile and the acid (feed III) contains 151 grams of HNO₃ dissolved in 16 liters of water. The temperature of polymerization is varied from 40–60° C. The data are in Table II.

*Table II*

|       | Polymerization Temp., °C. | Polymerization, pH | Conversion | Molecular Weight |
|-------|---------------------------|--------------------|------------|------------------|
| 2-A   | 60                        | 3.6                | 72         | 88,000           |
| 2-B   | 55                        | 3.6                | 71         | 80,000           |
| 2-C   | 50                        | 3.5                | 73         | 74,000           |
| 2-D   | 45                        | 3.5                | 68         | 64,000           |
| 2-E   | 40                        | 3.5                | 59         | 60,000           |

(C) The (A) portion of this example is repeated, except that the monomer (feed I) contains 2.0 percent 2-methyl-5-vinylpyridine, 8.0 percent vinyl acetate and 90 percent acrylonitrile and the acid feed contains 92.5 grams of HNO₃ dissolved in 16 liters of water. The temperature of polymerization is varied from 45–60° C. The data are in Table III.

*Table III*

|       | Polymerization Temp., °C. | Polymerization, pH | Conversion | Molecular Weight |
|-------|---------------------------|--------------------|------------|------------------|
| 3-A   | 60                        | 3.7                | 74         | 82,000           |
| 3-B   | 55                        | 3.8                | 73         | 79,000           |
| 3-C   | 50                        | 3.6                | 63         | 75,000           |
| 3-D   | 45                        | 3.6                | 59         | 66,000           |

(D) The (A) portion of this example is repeated, except that the monomer (feed I) contains 8.0 percent vinyl acetate and 92 percent acrylonitrile and the acid feed contains 84.2 grams of HNO₃ dissolved in 16 liters of water. The temperature of polymerization is varied from 40–60° C. The data are found in Table IV.

*Table IV*

|       | Polymerization Temp., °C. | Polymerization, pH | Conversion | Molecular Weight |
|-------|---------------------------|--------------------|------------|------------------|
| 4-A   | 60                        | 2.4                | 83         | 83,000           |
| 4-B   | 55                        | 2.6                | 83         | 81,000           |
| 4-C   | 50                        | 2.5                | 81         | 80,000           |
| 4-D   | 45                        | 2.4                | 79         | 78,000           |
| 4-E   | 40                        | 2.4                | 72         | 77,000           |

The data in Tables I–IV are plotted in the single FIGURE of the accompanying drawing. It is seen that molecular weight decreases more rapidly with decreasing temperature when the monomer feed contains 2-methyl-5-vinylpyridine than when no 2-methyl-5-vinylpyridine is used. However, molecular weight does decrease with temperature even when no 2-methyl-5-vinylpyridine is used, although the decrease is smaller.

The polymers described in the examples are converted to fibers following the general procedure described in, for instance, U.S. Patents Nos. 2,558,730, –731, and –733. A spinning solution comprised of ten parts of polymer, 45 parts of sodium thiocyanate, and 45 parts of water is extruded at a temperature of 95° C. through a 45-hole spinnerette at such a rate that 0.584 gram of polymer is extruded per minute. The maximum rate at which the gelled fiber can be collected without causing a break is considered to be the "maximum pullaway." Under standard conditions the fiber in gel state is collected at 10 meters/minute, washed free of solvent, and stretched during its passage through a hot water bath by passing it about a roll having a peripheral speed of 82.3 meters/minute. The stretched fiber is then dried and heated in relaxed state as described in the afore-mentioned patents, after which it is wound onto a bobbin at the rate of 70 meters per minute. The final denier of the fiber is 1.67/filament.

We claim:
1. The method which comprises:

(I) continuously charging to a reaction zone
    (A) a polymerizable material selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping,
    (B) an aqueous acidic medium, and
    (C) a redox-catalyst system comprising chlorate ions and sulfite ions,
      (a) the amount of chlorate ions being within the range of from about 0.1% to about 3% and the amount of sulfite ions being within the range of from about 0.1% to about 9%, said percentages being by weight of the said polymerizable material,
      (b) the proportions of the said aqueous acidic medium and polymerizable material being such that the pH of the material in said zone is not higher than about 4.0 and the content of polymerizable material therein is not greater than 50%;
  (II) continuously polymerizing the reaction mass containing the aforesaid ingredients of (A), (B), and (C) in said reaction zone to a preselected average molecular weight at a temperature of the material in said zone which is maintained at a substantially constant preselected norm within the range of from 20° C. to 70° C. while successive increments of said polymerizable material are polymerized therein and the resulting polymer is discharged therefrom; and,
  (III) subsequent to an actual increase in the average molecular weight of the polymer that is discharged from the reaction zone, continuously polymerizing the succeeding increments of said polymerizable material in the said reaction zone at a decreased temperature below said norm but not below 20° C.,
      (c) said decreased temperature being between the selected norm within the aforesaid range and 20° C.,
      (d) while maintaining unchanged all of the other molecular weight-influencing conditions within said zone at the values that existed therein prior to the aforesaid temperature decrease,
    whereby the said succeeding increments of said polymerizable material are polymerized in said reaction zone into polymer of substantially the original molecular weight solely by the effect of the decreased reaction temperature and the necessity of otherwise disturbing the continuous process is avoided.

2. The process of claim 1 wherein the material in the reaction zone is maintained at a substantially constant pH within the range of from about 2.0 to about 3.6.

3. The method which comprises:

(I) continuously charging to a reaction zone
    (A) a polymerizable material selected from the group consisting of (1) acrylonitrile and (2) mixtures containing more than 50% by weight of acrylonitrile, the balance being at least one other different compound which is copolymerizable with acrylonitrile and which contains a $CH_2=C<$ grouping,
    (B) an aqueous acidic medium, and
    (C) a redox-catalyst system comprising chlorate ions and sulfite ions,
      (a) the amount of chlorate ions being within the range of from about 0.1% to about 2% and the amount of sulfite ions being within the range of from about 0.1% to about 6%, said percentages being by weight of the said polymerizable material, (b) the proportions of the said aqueous acidic medium and polymerizable material being such that the pH of the material in said zone is within the range of from about 2.0 to about 3.6 and the content of polymerizable material therein is not greater than 50%;

(II) continuously polymerizing the reaction mass containing the aforesaid ingredients of (A), (B), and (C) in said reaction zone to a preselected average molecular weight at a temperature of the material in said zone which is maintained at a substantially constant preselected norm within the range of from 35° C. to 65° C. while successive increments of said polymerizable material are polymerized therein and the resulting polymer is discharged therefrom; and, (III) subsequent to an actual increase in the average molecular weight of the polymer that is discharged from the reaction zone, continuously polymerizing the succeeding increments of said polymerizable material in the said reaction zone at a decreased temperature below said norm but not below 35° C., (c) said decreased temperature being between the selected norm within the aforesaid range and 35° C., (d) while maintaining unchanged all of the other molecular weight-influencing conditions within said zone at the values that existed therein prior to the aforesaid temperature decrease, whereby the said succceeding increments of said polymerizable material are polymerized in said reaction zone into polymer of substantially the original molecular weight solely by the effect of the decreased reaction temperature and the necessity of otherwise disturbing the continuous process is avoided.

4. A process according to claim 3 wherein the polymerizable material is a mixture containing at least 70% by weight of acrylonitrile.

5. A process according to claim 4 wherein the polymerizable material is a mixture containing at least 80% by weight of acrylonitrile, from 2% to 15% by weight of vinyl acetate and from 2% to 15% by weight of a vinylpyridine.

6. A process according to claim 5 in which the vinylpyridine component of the polymerizable material is 2-methyl-5-vinylpyridine.

References Cited in the file of this patent

UNITED STATES PATENTS

| | | |
|---|---|---|
| 2,628,223 | Richards | Feb. 10, 1953 |
| 2,751,374 | Cresswell | June 19, 1956 |
| 2,769,793 | Ham | Nov. 6, 1956 |